T. G. PLANT.
DRIVING SHAFT CONTROLLING MEANS.
APPLICATION FILED DEC. 22, 1909.

958,303.

Patented May 17, 1910.

Witnesses:
Amelia M. Ross
Marion P. Kimball

Inventor
Thomas G. Plant
by Robt. P. Hains
Atty.

T. G. PLANT.
DRIVING SHAFT CONTROLLING MEANS.
APPLICATION FILED DEC. 22, 1909.

958,303.

Patented May 17, 1910.

Witnesses:
Amelia M. Ross
Marion F. Kimball

Inventor
Thomas G. Plant
By Robt. P. Hains
Atty.

UNITED STATES PATENT OFFICE.

THOMAS G. PLANT, OF BOSTON, MASSACHUSETTS.

DRIVING-SHAFT CONTROLLING MEANS.

958,303.

Specification of Letters Patent. Patented May 17, 1910.

Application filed December 22, 1909. Serial No. 534,421.

*To all whom it may concern:*

Be it known that I, THOMAS G. PLANT, a citizen of the United States, residing at Boston, in the county of Suffolk and State of Massachusetts, have invented an Improvement in Driving-Shaft Controlling Means, of which the following description, in connection with the accompanying drawings, is a specification, like numerals on the drawings representing like parts.

The invention to be hereinafter described relates to machine driving shaft controlling means, and more particularly to such means as applied to driving shafts for alternatively connecting and disconnecting power and hand operating devices with relation thereto.

In some forms of machines it is desirable that the driving shaft may be entirely disconnected and locked from operative relation with its power actuating means while the machine is being turned over by hand, either for the purposes of trial, adjustment, repairs, cleaning, or the like; and with this fact in view, the aims and purposes of the present invention are to provide means of a simple and effective nature to enable the operator to readily prevent accidental power operation of the machine, even should the starting treadle be depressed, while he is engaged in hand manipulation of the machine parts.

The above objects and others will best be understood from the following description and accompanying drawings which show convenient forms of means for putting the invention into practical effect.

Figure 1:
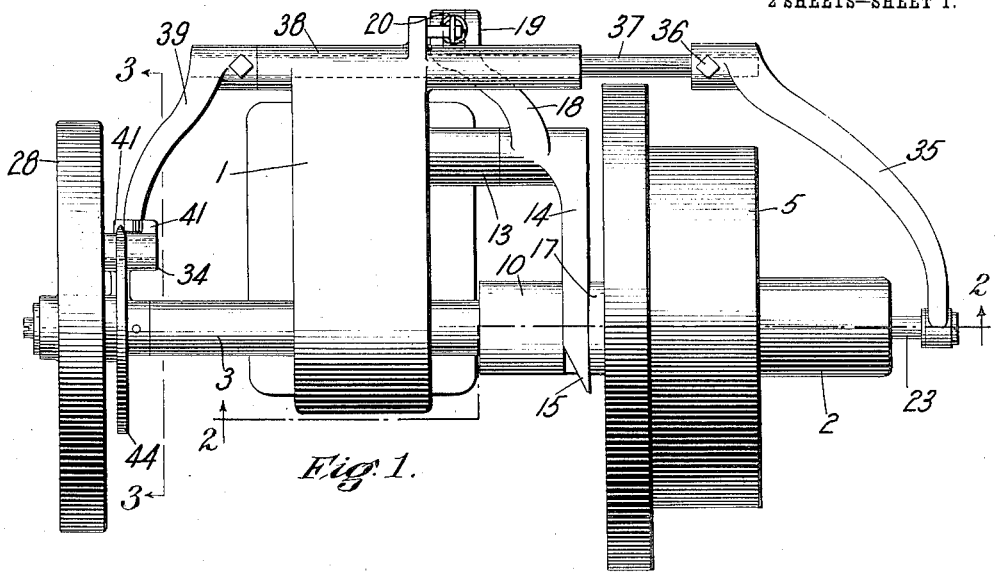
Figure 2:
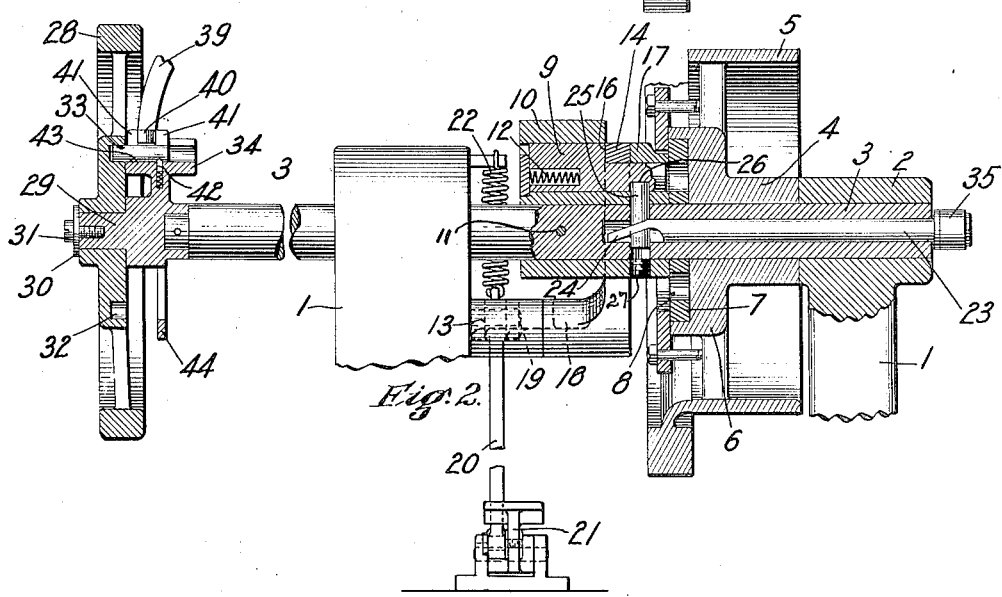
Figure 3:
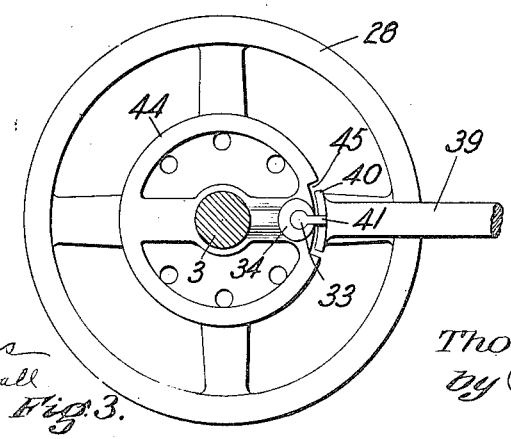
Figure 4:
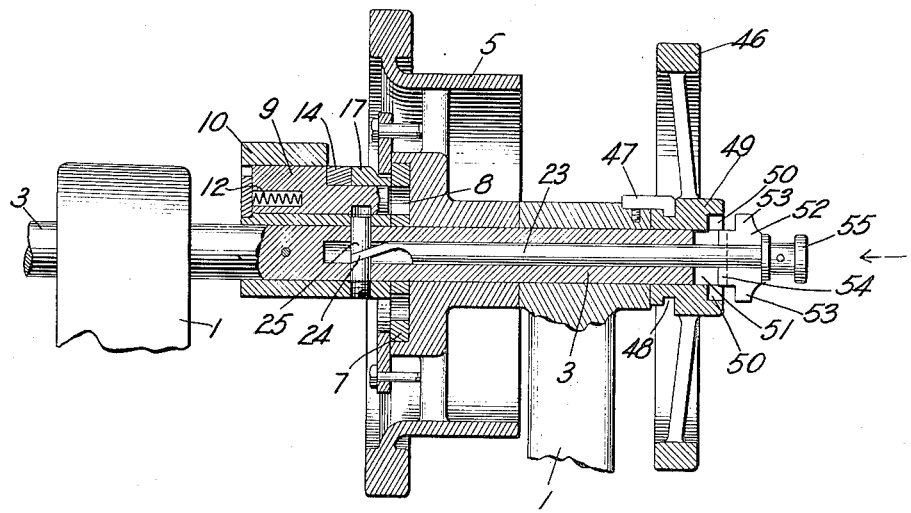
Figure 5:
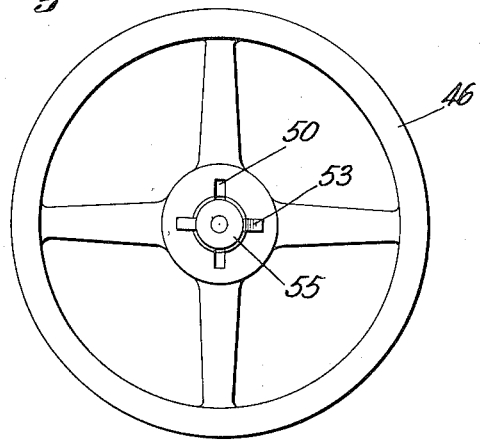

In the drawings:—Figure 1 is a plan view of so much of a machine and its driving shaft as is necessary to make clear the association of the present invention therewith; Fig. 2 is a section on the broken line 2—2, Fig. 1; Fig. 3 is a cross section on the line 3—3, Fig. 1; Fig. 4 is a modification, some of the parts being shown in section similar to Fig. 2; and Fig. 5 is an end view looking in the direction of the arrow, Fig. 4.

It is unnecessary herein to show and describe a particular machine, since the present invention is generally applicable to any machine wherein the parts derive motion from a driving shaft through clutch connections between it and a source of power.

In the illustrated form of the invention the machine frame, of any suitable design, has projecting portions 1 in which may be formed suitable bearings, as 2, for a driving shaft 3 from which the machine parts may be actuated in any desired manner. Loosely mounted on the driving shaft 3 is the hub 4 of a belt pulley 5 or other suitable power transmitting device which may be constantly driven from a source of energy. The hub 4 is provided with an enlargement 6 in which is contained a clutch ring 7 suitably secured to the hub 4 so as to rotate therewith. The clutch ring 7 has a series of openings 8 any one of which is adapted to be engaged by the end of a clutch pin 9 which is movable longitudinally of the shaft 3 in a suitable housing or casing 10 secured to and rotating with said shaft, as by means of the pin or other connection 11. The clutch pin 9 is normally under the influence of a spring 12, preferably seated in a recess in the clutch pin and acting to force said clutch pin into engagement with one of the recesses 8 of the clutch ring 7 when unrestrained from such action. Mounted on a suitable bearing 13 extending from the projection 1 of the main frame is an arm 14, Fig. 1, which has a beveled end portion 15, which at suitable times, as will hereinafter appear, is adapted to be interposed between a shoulder 16 on the clutch pin 9 and a part 17 of the casing 10 secured to the shaft 3. Extending rearward from the bearing 13 is an arm 18 connected at 19 to the upper end portion of a treadle rod 20 actuated by any suitable or usual form of treadle 21, as indicated in Fig. 2. A spring 22 normally acts to hold the arm 18 and treadle rod raised, and, perforce, the arm 14 in its depressed position, the construction being such that when the arm 14 is free to move under the influence of its spring 22, its beveled end 15 will insinuate itself between the shoulder 16 of the clutch pin and the part 17 of the casing as the shaft rotates and withdraw the pin 9 from engagement with the hole in the clutch ring 7.

The parts so far described may be constituted as any suitable form of clutch mechanism, the clutch members of which are movable into and out of operative relation by means of suitable treadle or other manually controlled means.

It is desirable at times that the operator may be enabled not only to disconnect the operative relation of the clutch members but that he may lock such members in inoperative relation while he turns the machine over by hand, and to this end the invention contemplates the provision of means whereby the operator may so lock the clutch members and at the same time cause hand actuating means to be operatively connected to the driving shaft, all as will now be described in connection with the embodiment of the invention illustrated.

Extending longitudinally and centrally of the driving shaft 3 is a sliding actuator 23 having an inclined end portion 24, Figs. 2 and 4, which engages a locking pin 25 disposed transversely of the driving shaft 3, the clutch pin 9 being provided with a socket portion 26 adapted to be engaged by the end of the locking pin 25, the construction being such that upon movement of the sliding actuator 23 longitudinally of the driving shaft the locking pin 25 will be moved transversely of the driving shaft to engage or disengage the clutch pin 9. If, for instance, the clutch pin 9 is in its retracted position and the machine is at rest, and the sliding actuator 23 be moved to the left, as indicated in Fig. 2, the locking pin 25 will be projected transversely of the driving shaft into locking engagement with the recess 26 of the clutch pin so that even though the treadle 21 be depressed to disengage the arm 14 from between the shoulder 16 of the clutch pin and the part 17 of the casing 10, said clutch pin cannot respond to the demands of its spring 24 and move into clutch engagement with its companion clutch member. In order that the locking pin 25 may be readily inserted during the assembling of parts, the driving shaft 3 and the casing 10 secured thereto are each provided with a transverse opening, and that at one side of the casing 10 may be conveniently closed by a screw plug 27.

As hereinbefore indicated it is desirable when the driving power is disconnected from the driving shaft, in the manner hereinbefore noted, that there shall be available some means for rotating the shaft by hand, one form of which is indicated in Figs. 1 and 2. The hand wheel 28 is loosely connected to the driving shaft 3, as for instance by being loosely mounted on the part 29, Fig. 2, secured to said shaft and held in place on said part by means of the suitable cap 30 held to the part 29 by a screw 31 or otherwise, the construction being such that when the machine is in normal operative condition and the clutch pin is not locked from engagement with its companion clutch member, the hand wheel 28 will be loose with respect to the driving shaft. In order to connect the hand member 28 operatively to the driving shaft when the clutch pin is locked from operative engagement with its companion member, said hand wheel 28 is provided with a series of holes 32, Fig. 2, any one of which is adapted to be engaged by a pin 33 sliding in suitable bearings 34 carried by the part 29 which is itself secured to or rotates with the driving shaft. From this construction it will be apparent that if the pin 33 be moved in its bearings 34 into engagement with one of the holes 32 in the hand wheel, the hand wheel will at once become locked to the driving shaft. In order to cause such sliding engagement of the pin 33 with one of the holes 32 of the hand wheel simultaneously with locking engagement of the locking pin 25 with the clutch pin 9, the sliding actuator 23 has connected thereto an arm 35 which is secured at 36, Fig. 1, to one end of a slide rod 37 movable longitudinally in a bearing 38 extending from the projection 1 of the main frame. To the opposite end portion of the slide rod 37 is connected an arm 39, Figs. 1, 2 and 3, the end portion of which is provided with a toe 40 adapted to engage between the lugs 41 projecting upward from the pin 33, Figs. 2 and 3, the construction being such that when the toe 40 is thus engaged between the lugs 41 of the pin 33, if the slide rod 37 be moved longitudinally, said pin 33 and simultaneously therewith the locking pin 25 will be moved out of or into locking engagement with its respective part, that is to say, if the slide rod 37 is moved to the right into the position indicated in Fig. 1, the locking pin 25 will be withdrawn from locking engagement with the clutch pin 9, so that the clutch members may be operatively engaged when the treadle is depressed, and the pin 33 will be disengaged from the hand wheel 28. Conversely, when the slide rod 37 is moved in the opposite direction the pin 33 will be engaged with the hand wheel to lock the same to the driving shaft and the locking pin 25 will be moved to lock the clutch pin so that the clutch members cannot be engaged. Since the pin 33 is carried by the part 29 secured to the driving shaft and the arm 39 is relatively non-rotatable, it follows that the lugs 41 will be disengaged from the toe 40 of the arm 39 when the driving shaft is in any other than substantially one prescribed position. To hold the pin 33 in its engaging or disengaging position with a hole 32 of the hand wheel when the driving shaft moves said projection 41 out of engagement with the toe 40 there is provided a pin 42, Fig. 2, normally spring pressed into engagement with one or the other of two locking depressions 43 in the pin 33, as will be clearly understood from Fig. 2.

It will be clear from what has been hereinbefore stated and from the construction described that upon a single rotation of the driving shaft the lugs 41 of the pin 33 will be carried out of engagement with the toe 40 and then back into engagement therewith, and in order to hold said toe in its proper engaging position with said lugs when they are out of engagement therewith there is provided a locking ring 44, the construction being such that when the slide rod 37 is moved, in the manner hereinbefore described, to carry the pin 33 into engagement with the hand wheel, the toe 40 will be at one side of the locking ring 44, to the left, Fig. 2, and upon rotation of the driving shaft this ring will prevent movement of the toe 40 to the right, consequently not only locking said toe from movement, but likewise the actuator 23 for the locking pin 25. Conversely, when the pin 33 has been moved to the right, Fig. 2, from engagement with the hand wheel 28, and consequently the locking pin 25 also withdrawn from locking engagement with the clutch pin 9, and the driving shaft rotated, the toe 40 and perforce the actuator 23 will be prevented from movement to the left until one complete rotation of the driving shaft, whereupon an opening 45 in the locking ring 44 coming opposite the toe 40, when it is in engagement between the lugs 41, will permit the toe 40 to move to the right or left.

From the general construction hereinbefore noted it will be obvious that not only are the clutch members locked from engagement during the hand manipulation of the machine, but the hand wheel is simultaneously locked to the driving shaft, whereas at other times it is loose with respect thereto. Moreover, it will be obvious from the construction described that the locking pin 25 and the pin 33 can be moved to engage and disengage their respective members only when the driving shaft has made one complete rotation and has been brought into position such that the lugs 41 on the pin 33 will engage the toe 40, at which time said toe 40 may move in either direction through the recess 45 of the locking ring.

It will be obvious to one skilled in the art that various changes may be made in the details for accomplishing the purposes and results hereinbefore noted, and one form of such change or modification is represented in Figs. 4 and 5, wherein the hand wheel 46 is mounted loosely upon the driving shaft 3 at the end thereof adjacent the clutch members, being properly held on the driving shaft by means of a finger 47 projecting into a recess 48 circularly disposed about the hub 49 of said hand wheel. The hub 49 of the hand wheel is provided with radially disposed recesses 50 and the end portion of the driving shaft 3 is likewise provided with a transverse recess 51. Secured to the actuator 23 adjacent the end thereof is a wing piece 52, the portions 53 whereof are adapted to engage the recesses 50 in the hub 49 and the portion 54 of which is adapted to simultaneously engage the transverse recess 51 in the end of the driving shaft, the construction being such that upon movement of the actuator 23 to the left, Fig. 4, to cause the locking pin to engage and hold the clutch pin from operative engagement with its companion clutch member, the wing piece 52 will simultaneously lock the hand wheel 46 to the driving shaft so that the driving shaft may then be rotated by hand. Conversely, upon withdrawing the actuator 23 to the right, Fig. 4, by means of the hand piece 55 secured to the end thereof, the locking pin 25 will be withdrawn from locking engagement with the clutch pin and simultaneously therewith the hand wheel and driving shaft will be operatively disconnected.

It will be noted that the actuator 23 rotates with the driving shaft and in view of this fact the arm 35, Fig. 1, is connected to the actuator between suitable collars, which permits the actuator to turn in the end of the arm 35 but compels movement of the actuator longitudinally of the driving shaft upon corresponding movement of the arm 35.

What is claimed is:

1. In a device of the character described, the combination of a driving shaft, driving means therefor, clutch members for operatively connecting and disconnecting said shaft and driving means, a locking pin extending transversely of said shaft to lock the clutch members from operative engagement, an actuator extending longitudinally of said shaft, a hand wheel normally loose with respect to said driving shaft, and means connected to the actuator for locking the hand wheel to the shaft and moving the locking pin transversely of the shaft into locking engagement with a clutch member and to free the hand wheel when the locking pin is withdrawn.

2. In a device of the character described, the combination of a driving shaft, clutch members associated therewith, a clutch coupling pin, a locking pin extending transversely of said shaft, and an actuator extending longitudinally of said shaft and having an inclined portion to engage the locking pin and move it transversely of the shaft into position to lock the clutch coupling pin out of clutch coupling position.

3. In a device of the character described, the combination of a driving shaft, clutch members associated therewith, a locking pin extending transversely of said shaft, an actuator extending longitudinally of said shaft and having an inclined portion to engage the locking pin and move it transversely of the shaft into position to lock the clutch members from operative engagement, a hand wheel normally loose with relation to the shaft, and means operated by movement of the actuator to operatively connect the hand wheel and shaft when the clutch members are locked from engagement.

4. In a device of the character described, the combination of a driving shaft, clutch members associated therewith, a locking pin carried by said shaft and extending transversely thereof to engage one of the clutch members and prevent their operative engagement, and an actuator extending longitudinally of the driving shaft and having a portion to engage said locking pin to move it transversely of the shaft into and out of locking engagement with respect to one of the clutch members.

5. In a device of the character described, the combination of a driving shaft, clutch members associated therewith, a locking pin carried by said shaft and extending transversely thereof to engage one of the clutch members and prevent their operative engagement, and an actuator extending longitudinally of the driving shaft, said locking pin and actuator having an inclined surface engagement for causing the pin to be moved transversely into and out of locking relation with one of the clutch members as the actuator is moved longitudinally of the driving shaft.

6. In a device of the character described, the combination of a driving shaft, clutch members associated therewith, a locking pin carried by said shaft and extending transversely thereof, an actuator disposed longitudinally of said shaft and having an inclined portion engaging said locking pin to move the latter transversely into and out of engagement with one of the clutch members as the actuator is moved longitudinally of the shaft, a hand wheel, and means operated as the actuator is moved longitudinally of the shaft to operatively connect or disconnect the shaft and hand wheel.

7. In a device of the character described, the combination of a driving shaft, clutch members associated therewith, a hand wheel loose with respect to said driving shaft, and means simultaneously to lock the clutch members from operative engagement and the hand wheel to said shaft and to unlock the clutch members that they may be operatively engaged and also unlock the hand wheel from operative connection with the shaft.

8. In a device of the character described, the combination of a driving shaft, clutch members associated therewith, a hand wheel loose with respect to said driving shaft, means to lock the clutch members so that they cannot be moved into operative relation and to lock the hand wheel to said shaft, and devices to prevent operation of said means until the driving shaft is in predetermined position.

9. In a device of the character described, the combination of a driving shaft, clutch members associated therewith, a hand wheel loose with relation to said shaft, a locking device to lock the clutch members from operative engagement, a locking device to lock the hand wheel to the shaft, and means for causing said devices to be moved simultaneously to lock the clutch members from operative engagement and to lock the hand wheel to the shaft.

10. In a device of the character described, the combination of a driving shaft, clutch members associated therewith, a hand wheel loose with relation to said shaft, a locking pin to lock the clutch members from operative engagement, a locking pin to lock the hand wheel to the shaft, means for causing said pins to be moved simultaneously to lock the shaft from operation by the clutch members and free it to operation by the hand wheel, and devices for locking said pins from movement until the shaft is in predetermined position.

11. In a device of the character described, the combination of a driving shaft, a driving member thereon, a clutch pin movable longitudinally of said shaft for connecting said member and shaft operatively, a locking pin carried by and movable transversely of the shaft to lock the clutch pin from operatively engaging said member and shaft, a manually-controlled actuating rod extending longitudinally of the shaft from said locking pin, and an operative connection between said transversely movable locking pin and said longitudinally movable actuating rod to cause said locking pin to lock and unlock the clutch pin by movement of the actuating rod lengthwise.

12. In a device of the character described, the combination of a driving shaft, a driving member thereon, a clutch pin movable longitudinally of said shaft for connecting said member and shaft operatively, a locking pin carried by and movable transversely of the shaft to lock the clutch pin from operatively engaging said member and shaft, a manually-controlled actuating rod extending longitudinally of the shaft from said locking pin, an operative connection between said transversely movable locking pin and said longitudinally movable actuating rod to cause said locking pin to lock and unlock the clutch pin by movement of the actuating rod lengthwise, and a locking device to prevent movement of the said actuating rod until the shaft is in a predetermined position.

13. In a device of .ie character described, the combination of a driving shaft, a driving member therefor, a clutch for operatively connecting the driving member and said shaft, a hand wheel loosely mounted with relation to said shaft, a locking device for locking the clutch in inoperative relation to the shaft, another locking device to lock the hand wheel to the shaft when the clutch is locked in inoperative relation to the shaft, and means for operating said locking devices.

14. In a device of the character described, the combination of a driving shaft, a driving member therefor, a clutch for operatively connecting the driving member and said shaft, a hand wheel loosely mounted with relation to said shaft, a locking device for locking the clutch in inoperative relation to the shaft, another locking device to lock the hand wheel to the shaft when the clutch is locked in inoperative relation to the shaft, means for operating said locking devices, and mechanism for preventing actuation of said last named means until the shaft is in a predetermined position.

15. In a device of the character described, the combination of a driving shaft, a driving member therefor, a clutch pin to operatively connect said shaft and driving member, said driving shaft having a recess extending transversely thereof, a locking pin disposed in said recess for movement transversely of the shaft, an actuating rod extending longitudinally of and within said shaft, and connections between the locking pin and actuating rod to cause movement of the locking pin transversely of the shaft to lock the clutch pin in inoperative position on movement of the actuating rod longitudinally of the shaft.

16. In a device of the character described, the combination of a driving shaft 3, clutch members associated therewith, a locking pin 25 for holding the clutch members out of operative relation, a loose hand wheel 28, a pin 33 for connecting the hand wheel and shaft, and devices disposed between the locking pin 25 and pin 33 to cause locking and unlocking movements of said pins.

17. In a device of the character described, the combination of a driving shaft 3, clutch members associated therewith, a locking pin 25 for holding the clutch members out of operative relation, a loose hand wheel 28, a pin 33 for connecting the hand wheel and shaft, devices disposed between the locking pin 25 and pin 33 to cause locking and unlocking movements of said pins, and a locking ring 44 to prevent such movements of the said pins until the shaft is in a predetermined position.

In testimony whereof, I have signed my name to this specification, in the presence of two subscribing witnesses.

THOMAS G. PLANT.

Witnesses:
AMELIA M. ROSS,
ALFRED H. HANDLEY.